United States Patent
Barnes et al.

(10) Patent No.: US 10,112,698 B2
(45) Date of Patent: Oct. 30, 2018

(54) DEPLOYMENT MECHANISM

(71) Applicant: LOCKHEED MARTIN CORPORATION, Bethesda, MD (US)

(72) Inventors: Nicholas L. Barnes, North Canton, OH (US); Ryan M. Alderfer, Binghamton, NY (US); Timothy J. Marley, Liverpool, NY (US); Stephen J. Schober, Ithica, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 189 days.

(21) Appl. No.: 15/172,710

(22) Filed: Jun. 3, 2016

(65) Prior Publication Data
US 2016/0355250 A1    Dec. 8, 2016

Related U.S. Application Data

(60) Provisional application No. 62/171,545, filed on Jun. 5, 2015.

(51) Int. Cl.
| | |
|---|---|
| *B64C 3/38* | (2006.01) |
| *B64C 5/10* | (2006.01) |
| *B64C 9/00* | (2006.01) |
| *B64C 13/00* | (2006.01) |
| *B64C 3/56* | (2006.01) |
| *B64C 39/02* | (2006.01) |

(52) U.S. Cl.
CPC .............. *B64C 3/56* (2013.01); *B64C 39/024* (2013.01); *B64C 2201/102* (2013.01); *B64C 2201/201* (2013.01); *F16C 2326/43* (2013.01)

(58) Field of Classification Search
CPC ........... B64C 3/56; B64C 3/38; B64C 39/024; B64C 2201/102; B64C 2201/201; F16C 2326/43; F42B 10/20
See application file for complete search history.

(56) References Cited

U.S. PATENT DOCUMENTS

| | | | |
|---|---|---|---|
| 3,415,467 A | * | 12/1968 | Barringer .................. F42B 8/24 244/3.29 |
| 3,625,631 A | | 12/1971 | Covington, Jr. |
| 5,600,868 A | | 2/1997 | Tourville et al. |
| 6,964,423 B1 | | 11/2005 | Chieh et al. |

(Continued)

FOREIGN PATENT DOCUMENTS

| | | |
|---|---|---|
| CN | 104071336 | 10/2014 |
| EP | 2604510 | 6/2013 |

(Continued)

OTHER PUBLICATIONS

Several Screen Shots from https://www.youtube.com/watch?v=rUmjGyfkvnU, 2015, 5 pages.

(Continued)

*Primary Examiner* — Philip J Bonzell
(74) *Attorney, Agent, or Firm* — Kent Kemeny; Andrew M. Calderon; Roberts Mlotkowski Safran Cole & Calderon, P.C.

(57) ABSTRACT

A deployment or hinge mechanism and, more particularly, a compact unmanned aerial vehicle (UAV) wing deployment mechanism is provided. The deployment mechanism includes a hinged mechanism that stows in a stacked configuration and deploys in a level configuration.

20 Claims, 7 Drawing Sheets

(56) References Cited

U.S. PATENT DOCUMENTS

| | | | | |
|---|---|---|---|---|
| 8,089,034 | B2* | 1/2012 | Hammerquist | B64C 3/56 244/3.27 |
| 8,708,286 | B2* | 4/2014 | Sakurai | B64C 3/56 244/201 |
| 8,876,039 | B2* | 11/2014 | Lubenow | B64C 39/024 244/3.28 |
| 8,985,504 | B2* | 3/2015 | Tao | B64C 3/44 244/3.28 |
| 9,108,713 | B2* | 8/2015 | Tao | B64C 3/44 |
| 9,689,650 | B2* | 6/2017 | Vainshtein | F24B 15/01 |
| 2008/0093501 | A1* | 4/2008 | Miller | B64C 39/024 244/49 |
| 2010/0264260 | A1 | 10/2010 | Hammerquist | |
| 2012/0068002 | A1* | 3/2012 | Unger | F24B 10/14 244/3.28 |
| 2012/0280080 | A1 | 11/2012 | Lubenow et al. | |
| 2016/0009370 | A1* | 1/2016 | Tao | B64C 3/44 244/39 |

FOREIGN PATENT DOCUMENTS

| | | |
|---|---|---|
| GB | 2543376 | 4/2017 |
| WO | 2016196277 | 12/2016 |

OTHER PUBLICATIONS

AeroVironment, Inc; www.avinc/uas/adc/switchblade, copyright 2016, 1 page.

International Seach Report dated Aug. 27, 2016 in related Application No. GB1608571.4, 4 pages.

Canadian Office Action dated May 5, 2017 for related Application No. 2930145, 3 pp.

International Seach Report and Written Opinion of the International Searching Authority dated Aug. 31, 2016 in related PCT Application No. PCT/US16/34613, 10 pages.

Examination Search Report dated Feb. 22, 2018 for related Application No. 2930145, 4 pp.

\* cited by examiner

DEPLOYMENT MECHANISM

FIELD OF THE INVENTION

The invention is directed to a deployment or hinge mechanism and, more particularly, to a compact unmanned aerial vehicle (UAV) wing deployment mechanism.

BACKGROUND DESCRIPTION

For many reasons it is desirable to have a unmanned aerial vehicle (UAV) design which can be easily folded into a compact configuration, then quickly formed into a flight ready configuration. Many UAV wing deployment hinges, though, stow and deploy wings at an uneven height. Wings that are flown at uneven heights cause aerodynamic inefficiencies.

To minimize the height differences the wings are built as relatively thin airfoil profiles. But, thin airfoil wings do not provide the efficient lift at low flight speed desired for long loitering UAV systems. Instead, aeronautical engineers desire thick section wings and clean aerodynamics for efficient low speed flight. When stowed the thick section wings consume the same space as the body of the vehicle, which will consume space needed for batteries and payload.

Also, the UAV needs to be packed into as small of a volume as possible. Because of the large deployment of round launcher tubes, it is extremely valuable for the UAV to pack into a round tube. These factors, aerodynamic design and small round packing form factor are in opposition to each other. Accordingly, traditional folding techniques do not work very well.

SUMMARY OF THE INVENTION

In an aspect of the invention, a deployment mechanism comprises a hinged mechanism that stows in a stacked configuration and deploys in a level configuration. The hinged mechanism includes an inner wing mount and an outer wing mount. The inner wing mount includes a ramped guide slot which is structured to allow both rotational movement and vertical movement with respect to the outer wing mount. The inner wing mounts are deployable by a pretensioning of a spring assembly, housed in a spring housing. The spring assembly is a spring that is pretensioned then retained using set screws. The set screws mount the outer wing mount to the spring housing. The pretensioning of the spring assembly is transferred through a torque tube attached to the inner wing mount. The single pin assembly is provided through pin guides of the inner wing mount, the outer wing mount and the torque tube. The inner wing mount, the outer wing mount and the torque tube are cylindrically shaped, and fit within the mount which is cylindrically shaped. The inner wing mount, the outer wing mount and the torque tube are nested within the mount. The mount is attached to an aircraft frame. The inner wing mount and the outer wing mount are deployable at different sweep angles. The torque tube is attached to the inner wing by a pin and slot assembly, spline assembly, or a keyway assembly. A bearing sleeve provided between the inner wing mount and the outer wing mount. Aircraft wings are attached to the hinged mechanism.

In an aspect of the invention, a deployment mechanism comprises a hinged mechanism that when deployed, an inner wing mount is rotated counter to an outer wing mount, and deploys from a stacked configuration to a level configuration.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to a deployment mechanism and, more particularly, to a compact unmanned aerial vehicle (UAV) wing deployment mechanism. In embodiments, the deployment mechanism employs a hinge that stows in a stacked configuration and deploys in a level configuration. This deployment mechanism allows the wings of an aircraft to have desirable airfoil profiles and deploy to even heights during flight, while also allowing the aircraft to fold up small enough to fit into a launch tube, e.g., a launch tube with a 3.5" ID. Also, the deployment mechanism has a reduced number of components (compared to conventional systems) which should increase the reliability of the entire system. For example, the deployment mechanism does not need additional springs to clamp hinge sections together, amongst other features.

Figure 1:
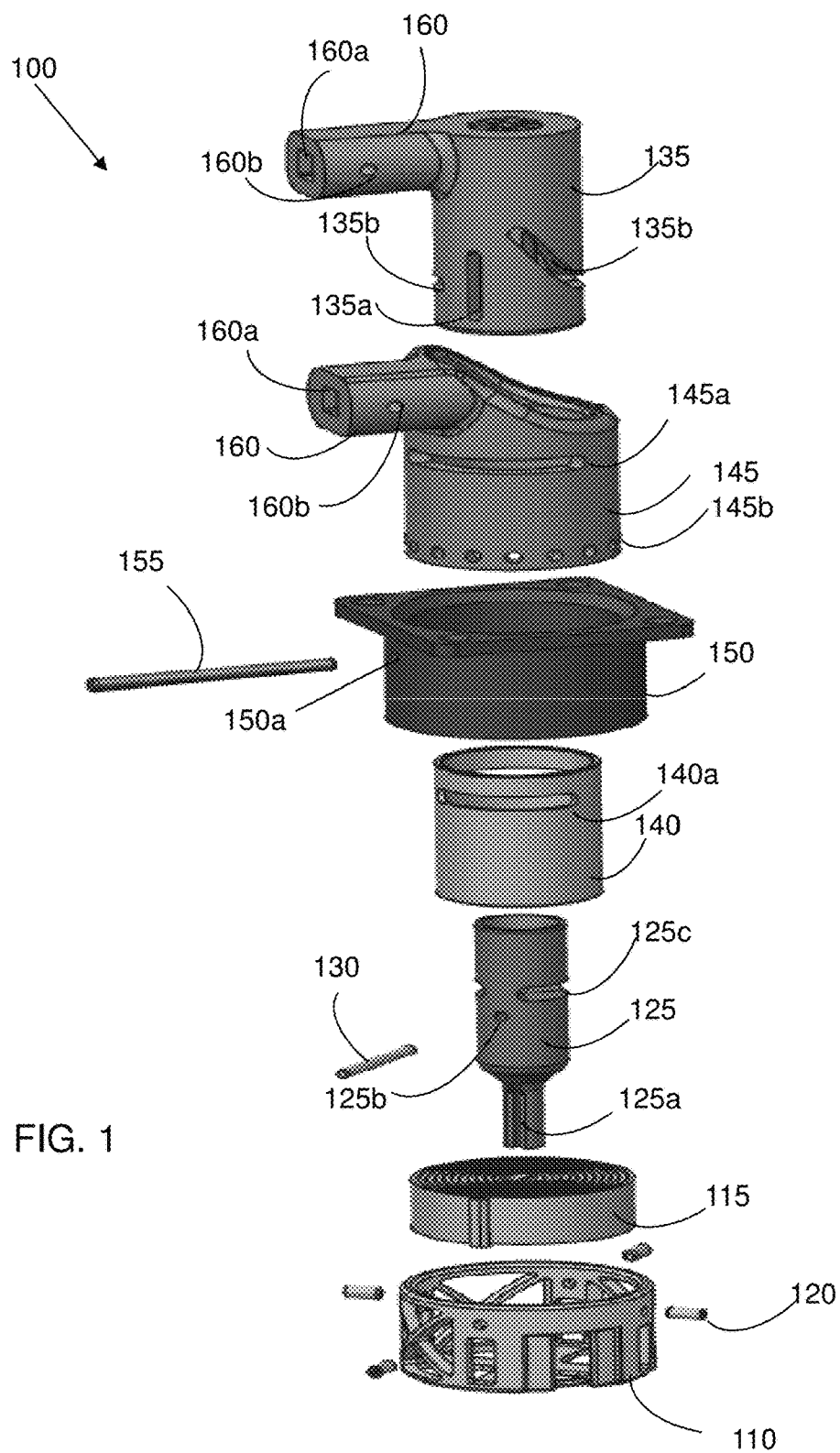
FIG. 1 shows an exploded view of a deployment mechanism in accordance with aspects of the invention.
Figure 2:
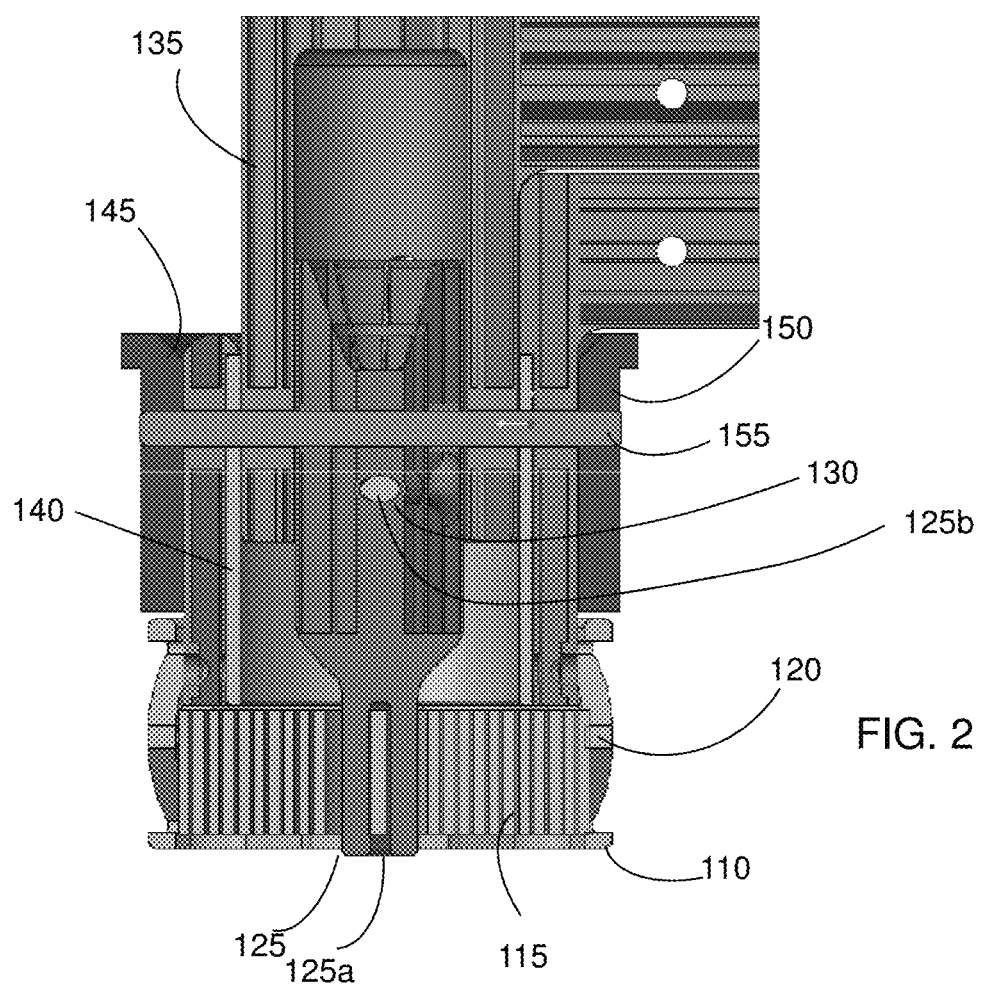
FIG. 2 shows a cross-sectional view of the deployment mechanism of FIG. 1 in accordance with aspects of the invention.

FIG. 1 shows an exploded view of a deployment mechanism and FIG. 2 shows a cross-sectional view of the deployment mechanism of FIG. 1, in accordance with aspects of the invention. Referring to FIGS. 1 and 2, in embodiments, the deployment mechanism 100 is a multi-part spring-loaded mechanism held together by a single pin (e.g., pin 155) and guided by a pin guide (e.g., ramped pin guide 135b) from a stacked configuration (e.g., see FIGS. 5 and 7a) to a level configuration (e.g., see FIGS. 6 and 8). The deployment mechanism 100 requires no lubricant and little maintenance.

In embodiments, the deployment mechanism 100 incorporates a spring (e.g., spring assembly 115) to auto deploy aircraft wings quick enough to allow the aircraft enough time to obtain flight control, e.g., after a 100+ G launch from a launch tube. Advantageously, the hinge and spring mechanism is a self contained mechanism and is easily removable or replaceable by use of a single mount (e.g., mount 150). For example, the deployment mechanism can be mounted to the aircraft with only four screws, although other mounting configurations are also contemplated by the present invention. In this way, the deployment mechanism can be pre-assembled and transported for later integration and sold separately as a single unit.

In embodiments, the deployment mechanism 100 stows wings of an aircraft in an over-under configuration under tension and when released opens quickly into a level flying configuration as further described herein. The configuration permits wing deployment with low internal system forces which allow the system to operate with little slop and quick motion. Also, the design is self-contained, e.g., provided in a nested configuration (as shown, e.g., in FIG. 2), which can be quickly swapped in-field when necessary. The deployment mechanism 100 can also be serviced in the field with simple hand tools.

More specifically, the deployment mechanism 100 includes a spring housing 110 (e.g., cylindrical spring housing) which can be rotated independent of an inner wing mount 135 to allow a wide adjustment in preload. In embodiments, the spring housing 100 can also rotate in unison with an outer wing mount 145 by fixing the outer wing mount 145 to the spring housing 110 using set screws 120. More specifically, the set screws 120 can be secured to openings (screw holes) 145b of the outer wing mount 145. In this way, the spring housing 110 can drive the motion of wing release as described further herein.

As with any of the components, the spring housing 110 can be made from aluminum or other lightweight and/or corrosion resistant materials. The spring housing 110, as with other components of the deployment mechanism 100, can be plated with surface treatment to reduce friction. This allows the deployment mechanism 100 to operate in harsh environments and require no lubricants. The spring housing 110, as with other components of the deployment mechanism 100, can also include internal ribbing structures giving the assembly the highest strength to weight ratio to maximize flight time and durability. If more durability is required, the ribbing structure can be thickened or the material altered to accommodate the structural requirements.

Still referring to FIGS. 1 and 2, a spring assembly 115 is housed within the spring housing 110. The spring assembly 115 can be a spiral or coil spring made from spring steel or other materials. In embodiments, the use of a coil spring can provide many advantages including, e.g., uniform strength and equal stress distribution, as well as close diameter tolerances.

In embodiments, the spring assembly 115 can be set to a predetermined load (or pretension) by use of the set screws 120. By way of example, the spring tension is adjustable by removing the set screws 120 on the spring housing 110 and reinstalling them at certain intervals, as needed, when the spring assembly 115 is loaded to a certain tension. In embodiments, the set screws 120 can be set at intervals of approximately 22.5° on the spring housing 110; although, other intervals are also contemplated by the present invention. As described further herein, by pre-tensioning of the spring assembly 115, wing deployment can be provided in a quick motion.

Due to the plurality of openings (screw holes) 145a of the outer wing mount 145, the set screws 120 can also fix the outer wing mount 145 to the spring housing 110 at any of the different intervals. The plurality of openings 145a, e.g., screw holes at many different locations, also facilitates the mounting of the outer wing mount 145 to accommodate different sweep angles of the wings as described herein.

As further shown in FIGS. 1 and 2, the spring assembly 115 is attached to a torque tube 125 (central spine). For example, in embodiments, the spring assembly 115 can be attached to the torque tube 125 through a slot 125a provided in the torque tube 125. By attaching the torque tube 125 to the spring assembly 115, the load of the spring assembly 115 can be transferred to an inner wing mount 135 to drive the motion of wing release as described further herein.

Figure 3A:
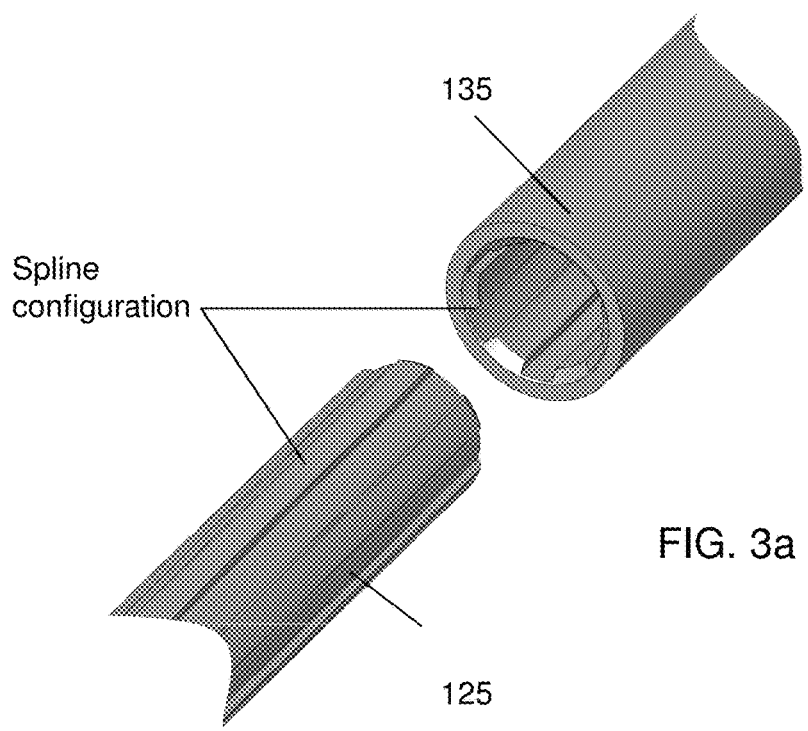
FIGS. 3a and 3b show alternative methods of transferring a load of a spring assembly from a torque tube to an inner wing mount in accordance with aspects of the invention.
Figure 3B:
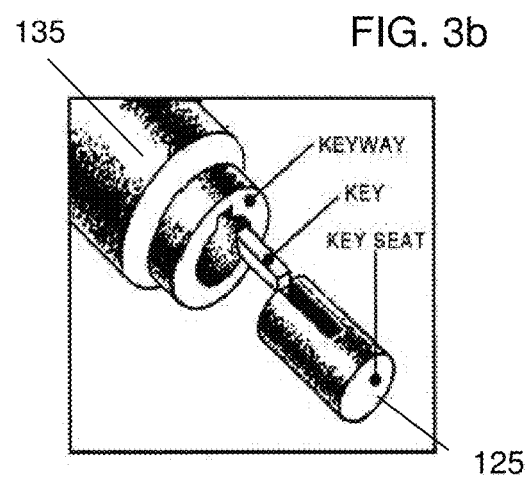
Figure 4A:
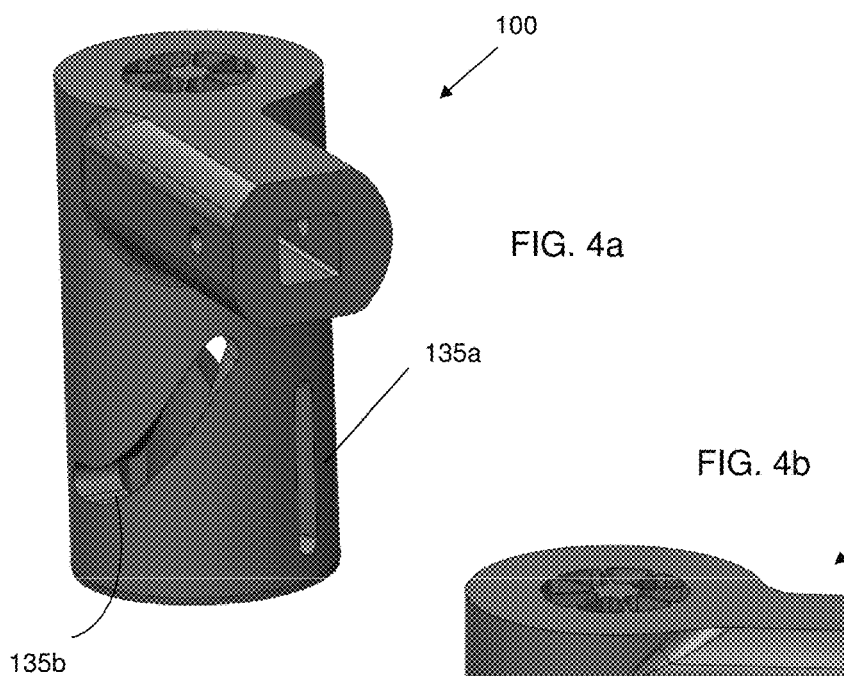
FIGS. 4a and 4b show alternative designs for inner wing mounts in accordance with aspects of the invention.
Figure 4B:
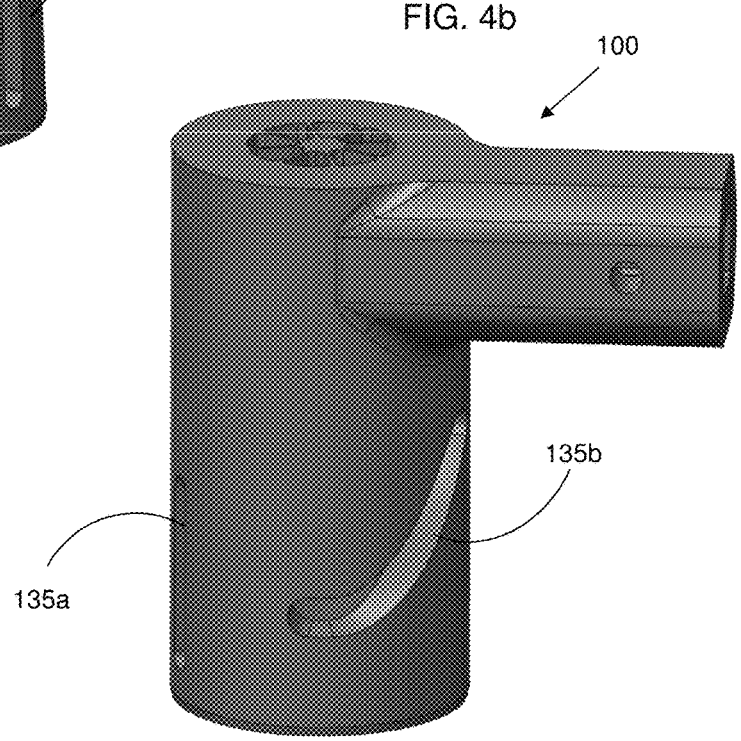

In embodiments, the inner wing mount 135 can be rotated (to drive the motion of wing release) by transferring the load of the spring assembly 115 to the inner wing mount 135 by a slot (pin guide) and pin mechanism, as one example. More specifically, a pin 130 can extend through horizontally openings (e.g., holes) 125b of the torque tube 125 and vertically oriented pin guides 135a of the inner mount 135 such that the inner wing mount 135 and the torque tube 125 are locked together and will rotate in unison. As should be understood, the vertically oriented pin guides 135a will also facilitate or allow vertical movement of the inner wing mount 135 in order for it to be stowed in a raised, stacked configuration and deployed to a lowered position. By having such connection, the load, e.g., torque, from the preloaded spring 115 can be transferred by the torque tube 125 to the inner wing mount 135, thus deploying a wing mounted to the inner wing mount 135. In alternative methods, a spline configuration (see, e.g., FIG. 3a) or keyway configuration (see, e.g., FIG. 3b) can be used to lock the torque tube 125 to the inner wing mount 135, thereby transferring the load of the spring assembly 115 to the inner wing mount 135.

As further shown in FIGS. 1 and 2, an optional sleeve bearing 140 can be positioned between an outer wing mount 145 and the inner wing mount 135, which are each mounted to a mount 150 by a single pin 155. The torque tube 125, which is positioned inside the optional sleeve bearing 140, is also mounted to the mount 150 with the single pin 155. In further optional embodiments, a sleeve bearing 140 can be provided between the inner mount and the torque tube.

More specifically, the mount 150 includes openings 150a and each of the sleeve bearing 140, outer wing mount 145 and inner wing mount 135 include respective pin guides (slots). For example, the sleeve bearing 140 and the outer wing mount 145 each include horizontally oriented pin guides 140a, 145a, respectively; whereas, the inner wing mount 135 includes a ramped pin guide 135b. A single pin 155 is inserted through each of the pin guides (slots) 135b, 140a, 145a, and the openings 150a of the mount 150 in order to mount these components to the mount 150. It should be understood by those of skill in the art that each of the sleeve bearing 140, outer wing mount 145 and inner wing mount 135 and mount 150 are cylindrical in shape to facilitate rotational movement.

In this configuration, shown more clearly in FIG. 2, the deployment mechanism 100 is a self contained mechanism, which can be easily assembly and disassembled by simply inserting and removing, respectively, a single pin 155. Also, the entire assembly can be removed and/or replaced as a single assembly by simply removing the mount 150 from an aircraft frame. In embodiments, the mount 150 can be mounted to an aircraft by four screws, although other mechanisms are contemplated by the present invention. By using such a simple mounting mechanism, the deployment mechanism can be pre-assembled and transported for later integration and sold separately as a single unit.

In embodiments, the horizontally oriented pin guides 140a, 145a and ramped pin guides 135b also allow independent rotational movement of each of the sleeve bearing 140, outer wing mount 145 and the inner wing mount 135 (with respect to the fixed mount 150). This allows deployment and stowing of wings of an aircraft as shown, e.g., in FIGS. 7a, 7b and 8.

More specifically, the ramped pin guides 135b allow the inner wing mount 135 to not only rotate, but also move in the vertical direction with respect to the entire assembly, and more specifically outer wing mount 145. In this way, a wing attached to the inner wing mount 135 can be stowed in a stacked configuration and deployed to a level configuration as further described herein. Also, the ramped pin guides 135b provide a simple method to drive the vertical position of the wing relative to the wing rotation, i.e., allow the wing mounts to rotate and follow prescribed vertical motions directly related to rotational position. Moreover, the ramped pin guides 135b control the mount position with minimal force, thus eliminating the need for bearings to control the position of the wings. Instead, the nominal system friction is low enough that only a simple bushing (e.g., optional sleeve bearing 140) and a low friction coating is required for smooth operation.

Still referring to FIGS. 1 and 2, in embodiments, the inner wing mount 135 and the outer wing mount 145 will each include a mount 160 which is configured and structured for mounting of a wing of an aircraft thereto. For example, the mount 160 can be an outwardly extending projection with an opening 160a formed therein. A wing can be positioned within the opening 160a and fixed into place with a screw fitted into hole 160b. Other configurations are also contemplated by the present invention.

In embodiments, the deployment mechanism 100 can be modified to allow wing deployment in both the forward or backward orientation. Also, the deployment mechanism 100 can be modified to obtain a wide range of deployed sweep angles desired to meet aerodynamic requirements. For example, a wide range of deployed sweep angles can be achieved by mounting the inner wing mount 135 by adjusting the length or location of the ramped pin guides 135b. Alternatively or in addition, the deployed sweep angles can be changed by mounting the outer wing mount 140 by adjusting the length or location of the pin guides 145a. In this way, the pin guides 145a and 135b can be provided at different locations or positions with respect to one another (and the fixed mount 150), thus allowing the wings to be deployed (rotated) from the stacked configuration to different sweep angles.

Figure 5:
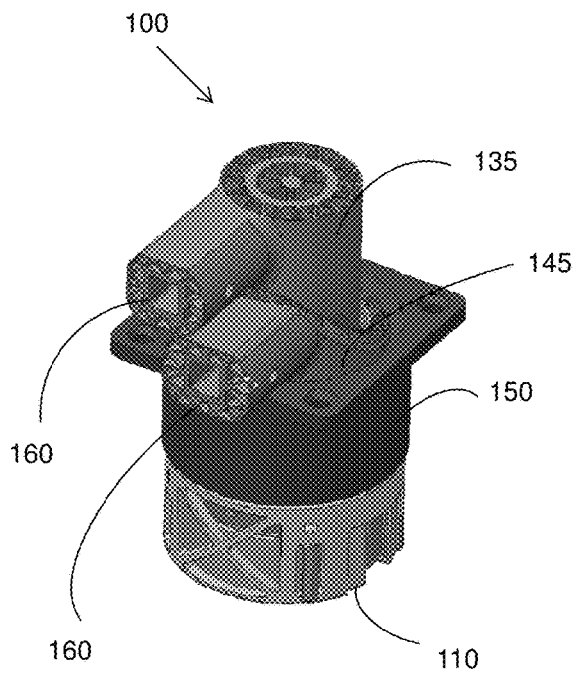
FIG. 5 shows the deployment mechanism in a stowed configuration in accordance with aspects of the invention.
Figure 6:
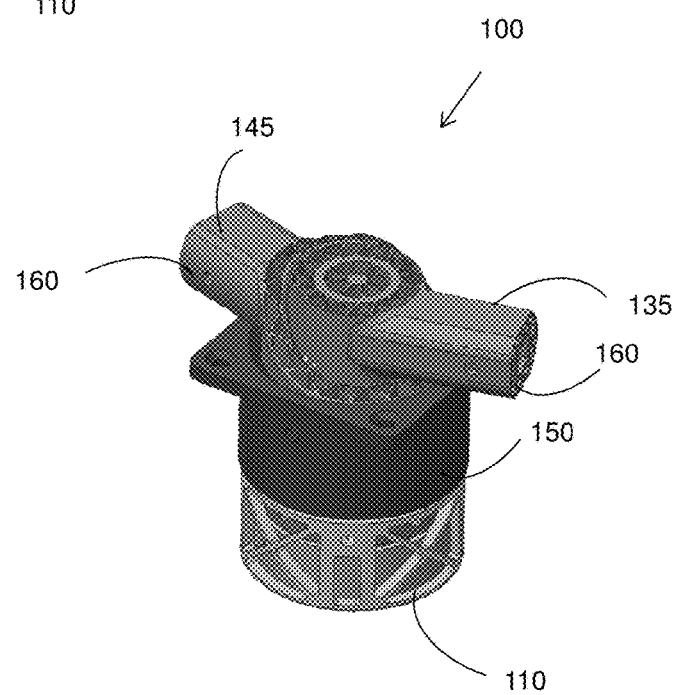
FIG. 6 shows the deployment mechanism in a deployed configuration in accordance with aspects of the invention.

FIG. 5 shows the deployment mechanism 100 in a stowed configuration; whereas, FIG. 6 shows the deployment mechanism 100 in a deployed configuration. As shown in the stowed configuration of FIG. 5, the inner wing mount 135 and the outer wing mount 145 are provided in a stacked configuration; that is, the inner wing mount 135 is raised above the outer wing mount 145 such that the mounts 160 are vertically aligned in a stacked configuration. This stacked configuration is possible due to the ramped pin guide 135b and, more specifically, the ramped pin guide 135b sliding along the fixed pin 155 unit the fixed pin 155 is at lower portion of the ramped pin guide 135b. In this configuration, the spring assembly 115 is provided in a pretension state, e.g., loaded state, ready for wing deployment.

In FIG. 6, though, the inner wing mount 135 and the outer wing mount 145 are provided in a deployed configuration; that is, the inner wing mount 135 and the outer wing mount 145 are deployed at a pre-determined sweep angle, with the mounts 160 of both the inner wing mount 135 and the outer wing mount 145 being at a level position (same height) along a common lateral axis. In this configuration, the spring assembly 115 has rotated the inner wing mount 135 (via the torque tube 125) into the deployed position, and the fixed pin 155 is now positioned at an upper portion of the ramped pin guide 135b. That is, the inner wing mount 135 has been lowered by having the ramped pin guide 135b ride along the fixed pin 155 (shown in FIGS. 1 and 2). Also, the outer wing mount 145 has been rotated by virtue of being attached to the spring basket 110.

Figure 7A:
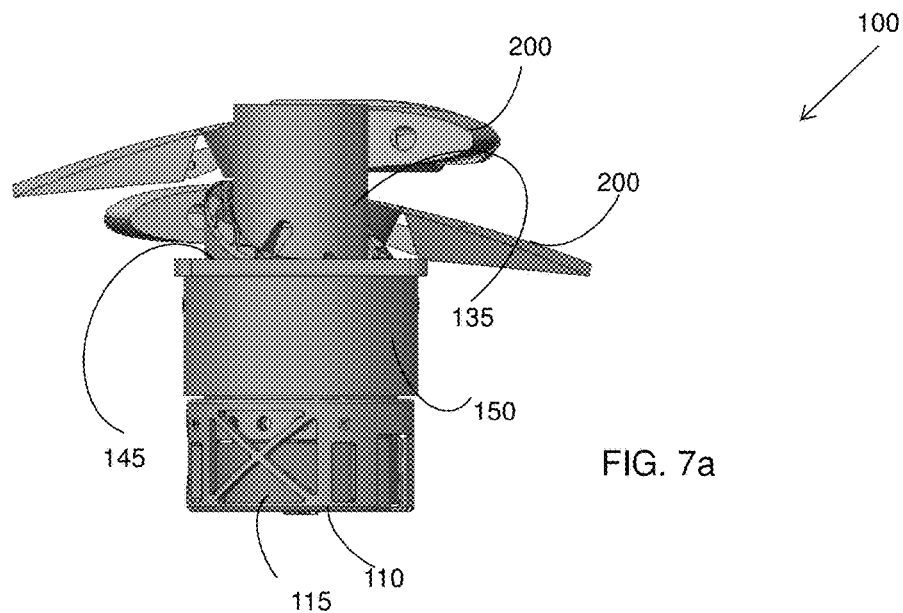
FIG. 7a shows a front view of the deployment mechanism attached to a wing assembly and in the stowed configuration in accordance with aspects of the invention.
Figure 7B:
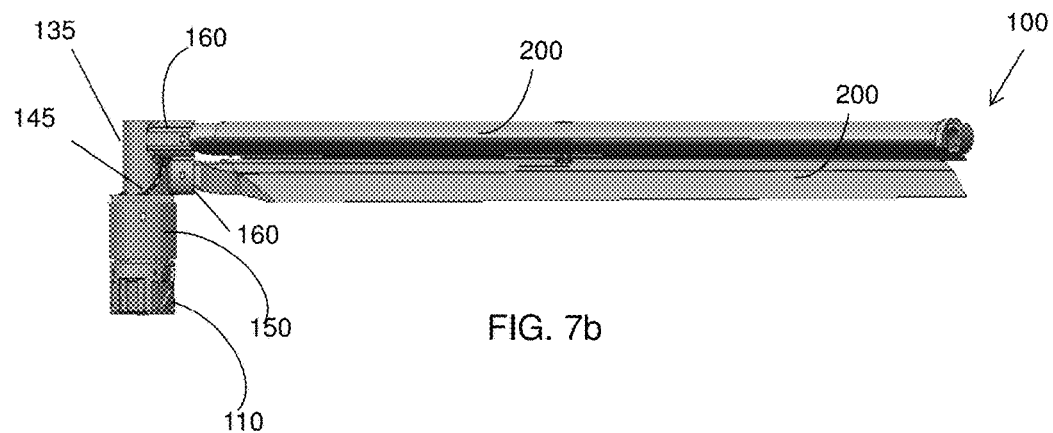
FIG. 7b shows a side view of the deployment mechanism attached to a wing assembly and in the stowed configuration in accordance with aspects of the invention.

FIG. 7a shows a front view of the deployment mechanism attached to a wing assembly and in the stowed configuration. FIG. 7b shows a side view of FIG. 7a. As shown in FIGS. 7a and 7b, the aircraft wings 200 are mounted to the inner wing mount 135 and the outer wing mount 145 and are provided in a stacked configuration, e.g., over-under configuration, under tension from the spring assembly 115 housed within the spring housing 110.

Figure 8:
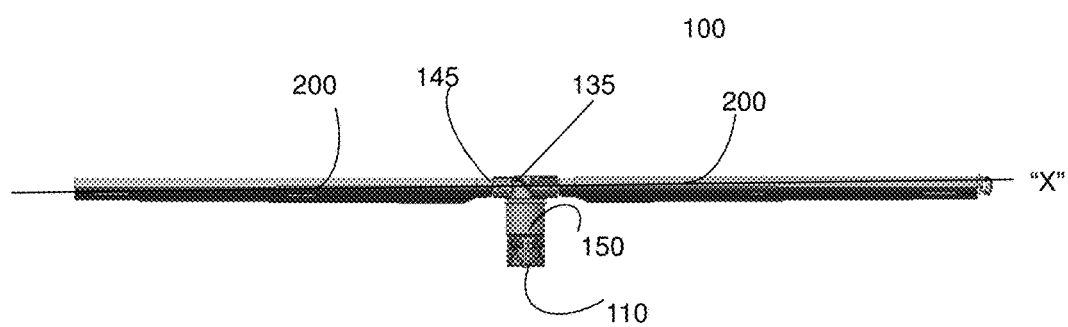
FIG. 8 shows a front view of the deployment mechanism attached to a wing assembly and in the deployed configuration in accordance with aspects of the invention.

FIG. 8 shows a front view of the deployment mechanism 100 in the deployed configuration in accordance with aspects of the invention. As shown in FIG. 8, the aircraft wings 200 are mounted to the inner wing mount 135 and the outer wing mount 145 and are provided in a deployed configuration, e.g., at a same height along a lateral axis "x". In the forward deployment direction, the deployment can be about 105° with respect to the stowed position; whereas, in the rear deployment direction, the deployment can be about 75° with respect to the stowed position. It should be understood though that other deployment angles are also contemplated by the present invention, depending on the aircraft requirements, etc. These deployment angles can be easily adjusted by simply fixing the inner wing mount 135 and/or the outer wing mount 145 at different rotational positions (such that the pin guides are provided at different positions with respect to one another). Also, the inner wing mount is rotated counter to the outer wing mount, and deploys from a stacked configuration to a level configuration.

As should now be understood by those of skill in the art, the deployment mechanism 100 is provided in a nested configuration, which can be provided in a cylindrical configuration, using a simple pin mechanism. The deployment mechanism 100 is compact and weight efficient, while providing aerodynamic efficiency. The deployment mechanism 100 can be easily redeployed without repeated maintenance by simply pretensioning, e.g., loading, the spring assembly. The deployment mechanism 100 is easily mounted to an aircraft as a single unit, without the need for additional springs to clamp the hinge sections together. This leads to a reduced number of components which increases system reliability. The deployment mechanism 100 can also be easily adjustable to accommodate a wide variety of aircraft requirements. In addition, the drive force of the spring assembly can be simply transferred with the torque tube. There also is no impact to Autopilot HW due to level-wing flight, and the system can be factory adjusted and serviced as a line replacement unit (LRU).

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A deployment mechanism, comprising a hinged mechanism that stows in a stacked configuration and deploys in a level configuration, wherein
the hinged mechanism includes an inner wing mount and an outer wing mount,
the inner wing mount is deployable by a pretensioning of a spring assembly,
the pretensioning of the spring assembly is transferred through a torque tube attached to the inner wing mount, and
the inner wing mount, the outer wing mount and the torque tube are mounted to a mount with a single pin assembly.

2. The deployment mechanism of claim 1, wherein the single pin assembly is provided through pin guides of the inner wing mount, the outer wing mount and the torque tube.

3. The deployment mechanism of claim 1, wherein the torque tube is attached to the inner wing mount by a pin and slot assembly.

4. The deployment mechanism of claim 1, wherein the torque tube is attached to the inner wing mount by a spline assembly.

5. The deployment mechanism of claim 1, wherein the torque tube is attached to the inner wing mount by a keyway assembly.

6. The deployment mechanism of claim 1, wherein the inner wing mount includes a ramped guide slot which is structured to allow both rotational movement and vertical movement of the inner wing mount with respect to the outer wing mount.

7. The deployment mechanism of claim 6, wherein the spring assembly is housed in a spring housing.

8. The deployment mechanism of claim 7, wherein the spring assembly is a spiral spring that is pretensioned then retained using set screws.

9. The deployment mechanism of claim 7, wherein set screws mount the outer wing mount to the spring housing.

10. The deployment mechanism of claim 1, wherein the inner wing mount, the outer wing mount and the torque tube are cylindrically shaped, and fit within the mount which is cylindrically shaped.

11. The deployment mechanism of claim 10, wherein the inner wing mount, the outer wing mount and the torque tube are nested within the mount.

12. The deployment mechanism of claim 10, wherein the inner wing mount and the outer wing mount are deployable at different sweep angles.

13. A deployment mechanism, comprising a hinged mechanism that stows in a stacked configuration and deploys in a level configuration, wherein
the hinged mechanism includes an inner wing mount and an outer wing mount,
the inner wing mount includes a ramped guide slot which is structured to allow both rotational movement and vertical movement of the inner wing mount with respect to the outer wing mount,
the inner wing mount is deployable by a pretensioning of a spring assembly, housed in a spring housing,
the pretensioning of the spring assembly is transferred through a torque tube is attached to the inner wing mount, and
a bearing sleeve is provided between the inner wing mount and the outer wing mount.

14. A deployment mechanism, comprising a hinged mechanism that when deployed, an inner wing mount is rotated counter to an outer wing mount, and deploys from a stacked configuration to a level configuration, the hinged mechanism includes a single pin assembly which mounts an inner wing mount, an outer wing mount and a torque tube to a mount.

15. The deployment mechanism of claim 14, further comprising a bearing sleeve provided between the inner wing mount and the outer wing mount.

16. The deployment mechanism of claim 14, wherein the single pin assembly is provided through pin guides of the inner wing mount, the outer wing mount and the torque tube.

17. The deployment mechanism of claim 14, wherein the torque tube is attached to the inner wing mount by a pin and slot assembly.

18. The deployment mechanism of claim 14, wherein the torque tube is attached to the inner wing mount by a spline assembly or a keyway assembly.

19. The deployment mechanism of claim 14, further comprising a spring assembly transferring a pretensioning through the torque tube which is attached to the inner wing mount.

20. The deployment mechanism of claim 19, wherein the spring assembly is housed in a spring housing.

* * * * *